United States Patent
Fukuda et al.

(10) Patent No.: US 9,463,741 B2
(45) Date of Patent: Oct. 11, 2016

(54) VEHICLE PERIPHERAL OBSTACLE NOTIFICATION SYSTEM

(71) Applicant: Hitachi Construction Machinery Co., Ltd., Tokyo (JP)

(72) Inventors: Yoshibumi Fukuda, Tokyo (JP); Chieko Onuma, Tokyo (JP); Hidefumi Ishimoto, Tsuchiura (JP); Moritaka Oota, Tsuchiura (JP); Yukihiro Kawamata, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/662,746

(22) Filed: Mar. 19, 2015

(65) Prior Publication Data

US 2015/0307024 A1    Oct. 29, 2015

(30) Foreign Application Priority Data

Apr. 25, 2014    (JP) .................. 2014-091571

(51) Int. Cl.
*G06K 9/00* (2006.01)
*B60Q 9/00* (2006.01)
(Continued)

(52) U.S. Cl.
CPC .................. *B60Q 9/008* (2013.01); *B60R 1/00* (2013.01); *G06K 9/00791* (2013.01); *G06K 9/00805* (2013.01); *G06T 7/2033* (2013.01); *G06T 11/60* (2013.01); *B60R 2300/8093* (2013.01);
(Continued)

(58) Field of Classification Search
CPC .......................................... G06T 2207/30261
See application file for complete search history.

(56) References Cited

U.S. PATENT DOCUMENTS 8,384,782 B2 * 2/2013 Hiroshi ..................... B60R 1/00
340/435
8,446,268 B2 * 5/2013 Hideshiro .............. H04N 7/181
340/435

(Continued)

FOREIGN PATENT DOCUMENTS

EP    2570556 A1    3/2013
EP    2631374 A1    8/2013

(Continued)

OTHER PUBLICATIONS

Extended European Search Report received in corresponding European Application No. 15161667.9 dated Sep. 21, 2015.

*Primary Examiner* — Soo Park
(74) *Attorney, Agent, or Firm* — Mattingly & Malur, PC

(57) ABSTRACT

A vehicle peripheral obstacle notification system, used on a construction machine, detects a moving obstacle, gives composite display of the detected moving obstacle, and notifies a user thereof, the moving obstacle being at a location not appearing in a composite bird's-eye view obtained by onboard cameras acquiring images of the surroundings of the vehicle including an image immediately under the vehicle body. The system has a composite image formation part that extracts composite image formation areas from the surrounding images to compose a composite bird's-eye image. A moving obstacle is detected using the surrounding images and it is decided whether the detected position of the moving obstacle is inside or outside the composite image formation areas. If the detected position is determined to be outside the composite image formation areas, information about the detected position is extracted and an image thereof is output for superimposition onto the composite bird's-eye image.

5 Claims, 16 Drawing Sheets

(51) Int. Cl.
  *B60R 1/00*     (2006.01)
  *G06T 7/20*     (2006.01)
  *G06T 11/60*    (2006.01)
  *E02F 9/26*     (2006.01)

(52) U.S. Cl.
  CPC ...... *E02F9/261* (2013.01); *G06T 2207/10016* (2013.01); *G06T 2207/20221* (2013.01); *G06T 2207/30261* (2013.01)

(56) References Cited

U.S. PATENT DOCUMENTS

| | | | |
|---|---|---|---|
| 8,655,019 B2* | 2/2014 | Kamiyama | B60R 1/00 348/148 |
| 9,050,931 B2* | 6/2015 | Yamamoto | G06K 9/00791 |
| 9,113,047 B2* | 8/2015 | Onuma | E02F 9/24 |
| 9,332,229 B2* | 5/2016 | Ishimoto | H04N 7/18 |
| 2008/0231702 A1* | 9/2008 | Matsumoto | B60R 1/00 348/148 |
| 2011/0001819 A1* | 1/2011 | Asari | G01C 21/3647 348/113 |
| 2013/0088593 A1* | 4/2013 | Ishimoto | E02F 9/226 348/143 |
| 2013/0261885 A1 | 10/2013 | Hargrave, Jr. et al. | |
| 2015/0217690 A1* | 8/2015 | Mitsuta | B60R 1/00 348/148 |

FOREIGN PATENT DOCUMENTS

| | | |
|---|---|---|
| JP | 2006-279752 A | 10/2006 |
| JP | 2008-248613 A | 10/2008 |
| JP | 2010-204821 A | 9/2010 |

* cited by examiner

VEHICLE PERIPHERAL OBSTACLE NOTIFICATION SYSTEM

BACKGROUND OF THE INVENTION

1. Field of the Invention

The present invention relates to a vehicle peripheral obstacle notification system. More particularly, the invention relates to a vehicle peripheral obstacle notification system which, used on a construction machine such as a large-sized dump truck working at a mine, performs detection and notification of obstacles near the vehicle body so as to efficiently evade the contact with such nearby obstruction.

2. Description of the Related Art

There exists an under-vehicle image display control device that generates a bird's-eye image covering the surroundings of the vehicle, and displays an under-vehicle image together with an image of the vehicle itself in a transparent manner. In addition to onboard cameras such as a rearview camera for imaging the vehicle surroundings, there is provided an onboard under-vehicle camera positioned at the bottom of the vehicle rear to acquire an image immediately under the bottom of the host vehicle, thereby to improve the capability of real-time acquisition of an under-vehicle image along with its accuracy. When the host vehicle travels in reverse, the onboard under-vehicle camera detects whether there is an obstacle in the expected traveling area of the host vehicle. When detecting a moving object in the acquired image, the control device generates and displays a transparent bird's-eye image including a transparent image immediately under the vehicle based on the currently acquired under-vehicle image (e.g., JP-2006-279752-A).

SUMMARY OF THE INVENTION

For large-sized construction machines such as dump trucks working at mines, there is a wide space under the body of the host vehicle. To ensure safe work with construction machines in such a situation, it is important not only to detect whether there are no obstacles such as persons or other vehicles in the space under the vehicle body but also to identify any detected obstacle and make notification thereof. The measures to be taken if the detected obstacle is a rock, for example, are vastly different from the measures to be taken if the obstacle is a person.

Generally, construction machines perform diverse kinds of work such as traveling and excavation on an unpaved rough terrain or on a ground surface where there are gravel, rocks, mud, and/or oil leaked from the machines. For this reason, if the above-mentioned known technique is applied to the construction machines, troubles may well be expected such as the inability to acquire images with poor visibility due to mud, oil, or dirt sticking to the lens of the onboard under-vehicle camera, or the destruction of the camera proper caused by scattering gravel or rock. If the onboard under-vehicle camera suffers from such poor visibility or is destroyed outright, it is impossible to detect or identify obstacles in the space under the vehicle body, with nothing appearing in the image being displayed. This can be a significant impediment to securing safety during work.

The present invention has been made in view of the above circumstances. An object of the invention is to provide a vehicle peripheral obstacle notification system which, used on a large-sized construction machine without an onboard under-vehicle camera, detects a moving obstacle, gives composite display of the detected moving obstacle, and notifies a user thereof, the moving obstacle being at a location not appearing in a composite bird's-eye view obtained by onboard cameras acquiring images of the surroundings of the vehicle including a view immediately under the vehicle body.

In achieving the foregoing and other objects of the present invention and according to one embodiment thereof, there is provided a vehicle peripheral obstacle notification system having a surrounding image input part that acquires images of the surroundings of a vehicle and outputs the acquired surrounding images, a composite image formation part that extracts composite image formation areas from the surrounding images acquired by the surrounding image input part and composes a composite bird's-eye image as an output resulting from the extracted composite image formation areas, and an output part that presents a user with the resulting output. The vehicle peripheral obstacle notification system includes: an object detection part that performs the process of detecting a moving obstacle by use of the surrounding images; an area determination part that determines whether the position at which the moving obstacle is detected by the object detection part is inside or outside the composite image formation areas; and an image information extraction part which, if the area determination part determines that the detected position of the moving obstacle is outside the composite image formation areas, then extracts information about the detected position of the moving obstacle and an image of the detected moving obstacle for output to the composite image formation part for superimposition thereby onto the composite bird's-eye image.

In a preferred variation of the embodiment outlined above, the composite image formation part may superimpose onto the composite bird's-eye image the information about the detected position of the moving obstacle and the image of the moving obstacle output from the image information extraction part so that the image of the moving obstacle is displayed at the detected position of the moving obstacle.

In another preferred variation of the embodiment above, the composite image formation part may superimpose onto the composite bird's-eye image the information about the detected position of the moving obstacle and the image of the moving obstacle output from the image information extraction part so that the detected position of the moving obstacle is highlighted and the image of the moving obstacle is displayed at a position different from the detected position of the moving obstacle.

In a further preferred variation of the embodiment above, if the area determination part determines that the detected position of the moving obstacle is inside the composite image formation areas, the image information extraction part may also extract the information about the detected position of the moving obstacle and the image of the detected moving obstacle for output to the composite image formation part for superimposition thereby onto the composite bird's-eye image.

In an even further preferred variation of the embodiment above, if the area determination part determines that the detected position of the moving obstacle is outside the composite image formation areas, the image information extraction part may extract the information about the detected position of the moving obstacle and extract the surrounding image including the detected position for output to the composite image formation part. The composite image formation part may provide translucent display of the areas other than those indicated by the composite bird's-eye image and highlight the detected position of the moving obstacle when composing the surrounding images.

In a still further preferred variation of the embodiment above, if the area determination part determines that the detected position of the moving obstacle has changed from inside to outside the composite image formation areas, the image information extraction part may retain the image of the moving obstacle acquired inside the composite image formation areas. While the detected position of the moving obstacle remains outside the composite image formation areas, the image information extraction part may output the information about the detected position of the moving obstacle and the retained image of the moving obstacle acquired inside the composite image formation areas to the composite image formation part for superimposition thereby onto the composite bird's-eye image.

According to the present invention, without recourse to an onboard under-vehicle camera, it is possible to detect and image a moving obstacle at a position not appearing in a composite bird's-eye view merged with a view immediately under the vehicle body and covering the surroundings of the host vehicle, the position and image of the moving obstacle being superimposed onto a display screen prompting the user to know quickly what kind of obstacle is detected at what location. This allows the user easily to determine how to deal with the detected moving obstacle. As a result, the efficiency of the entire work being done is improved.

BRIEF DESCRIPTION OF THE DRAWINGS

Further objects and advantages of the present invention will become apparent upon a reading of the following description and appended drawings in which.

DESCRIPTION OF THE PREFERRED EMBODIMENTS

Some preferred embodiments of the present invention will now be explained with reference to the accompanying drawings through the use of examples in which the invention is applied to a dump truck, a large-sized transport vehicle that carries rubble, mineral ores, etc., excavated at a mine, for example. It should be noted that the application of the present invention is not limited to dump trucks.

First Embodiment

Figure 1:
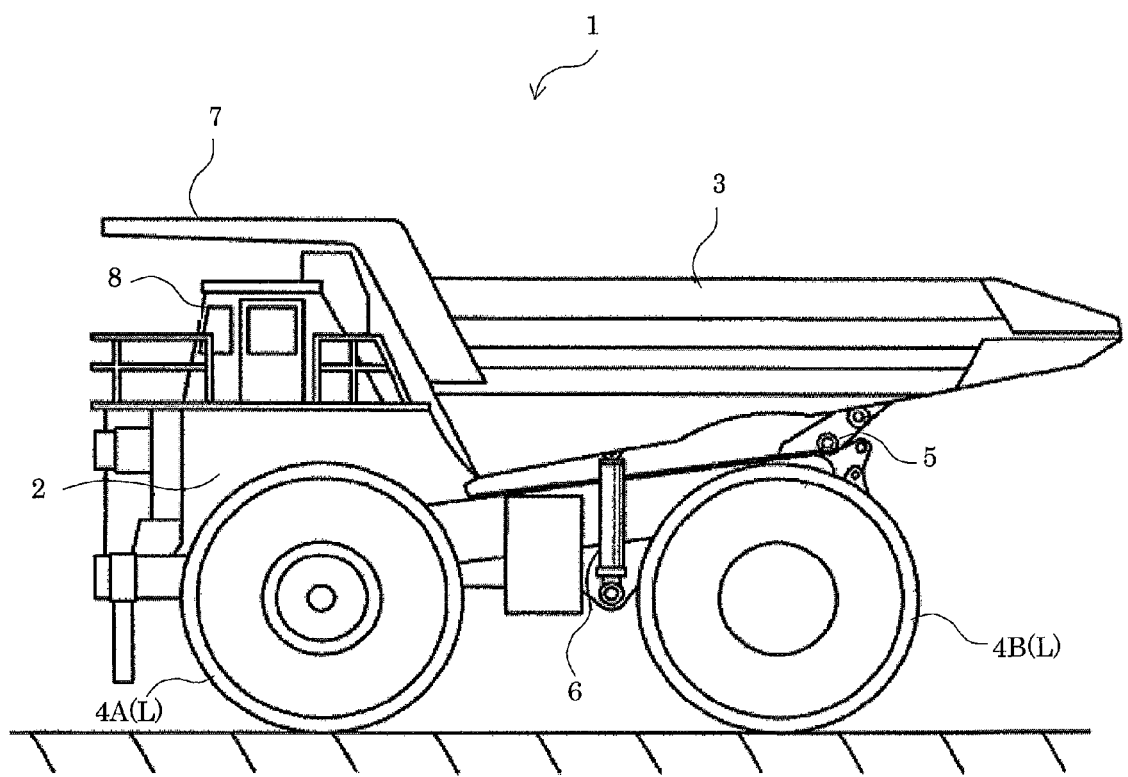
FIG. 1 is a side view showing a dump truck having a vehicle peripheral obstacle notification system as a first embodiment of the present invention.

FIG. 1 is a side view showing a dump truck having a vehicle peripheral obstacle notification system as the first embodiment of the present invention. A dump truck 1 (host vehicle) 1 shown in FIG. 1 is furnished primarily with a vehicle body 2 made of a sturdy frame structure, a vessel (bed) 3 mounted tiltably on the vehicle body 2, and a left front wheel 4A(L) and a left rear wheel 4B(L) attached to the vehicle body 2.

An engine (not shown) for driving the rear wheels 4B is mounted on the vehicle body 2. Typically, the engine has an engine control unit (ECU), and the revolutions of the engine are controlled by command signals from the ECU regulating the flow rate of the fuel being supplied to the engine.

The vessel 3 is provided to carry cargoes such as rubble and coupled tiltably to the vehicle body 2 via a pin coupling part 5, among others. Under the vessel 3 are two tilting cylinders 6 arranged in the direction of the vehicle width with a predetermined distance therebetween. Feeding and evacuating pressure to and from the tilting cylinders 6 causes the cylinders 6 to extend and contract, thereby tilting the vessel 3. Also, a canopy 7 is provided above the vessel 3 toward the front.

The canopy 7 has the function of protecting a cabin 8 below (i.e., in front of the vehicle body 2) from scattering objects such as stones and rocks and also protecting the cabin 8 if the vehicle is overturned. Inside the cabin 8, there are provided a control device 100 (see FIG. 4) constituting the vehicle peripheral obstacle notification system, a steering wheel (not shown), an accelerator pedal (not shown), and a brake pedal (not shown).

Figure 2:
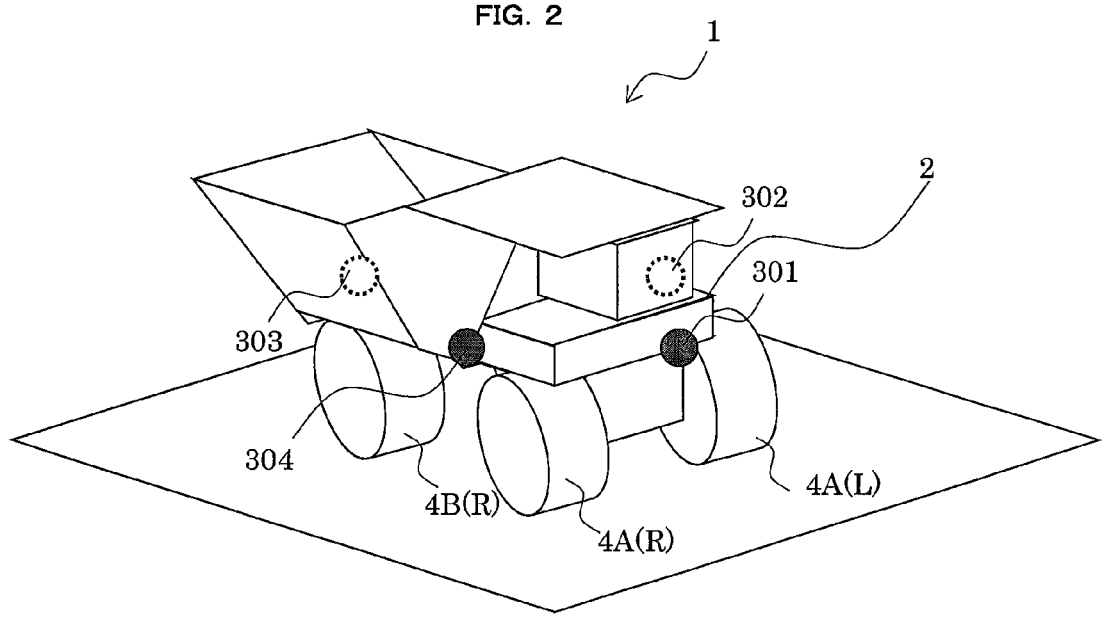
FIG. 2 is a conceptual view explaining the arrangement of cameras making up a surrounding image input part of the vehicle peripheral obstacle notification system as the first embodiment.
Figure 3:
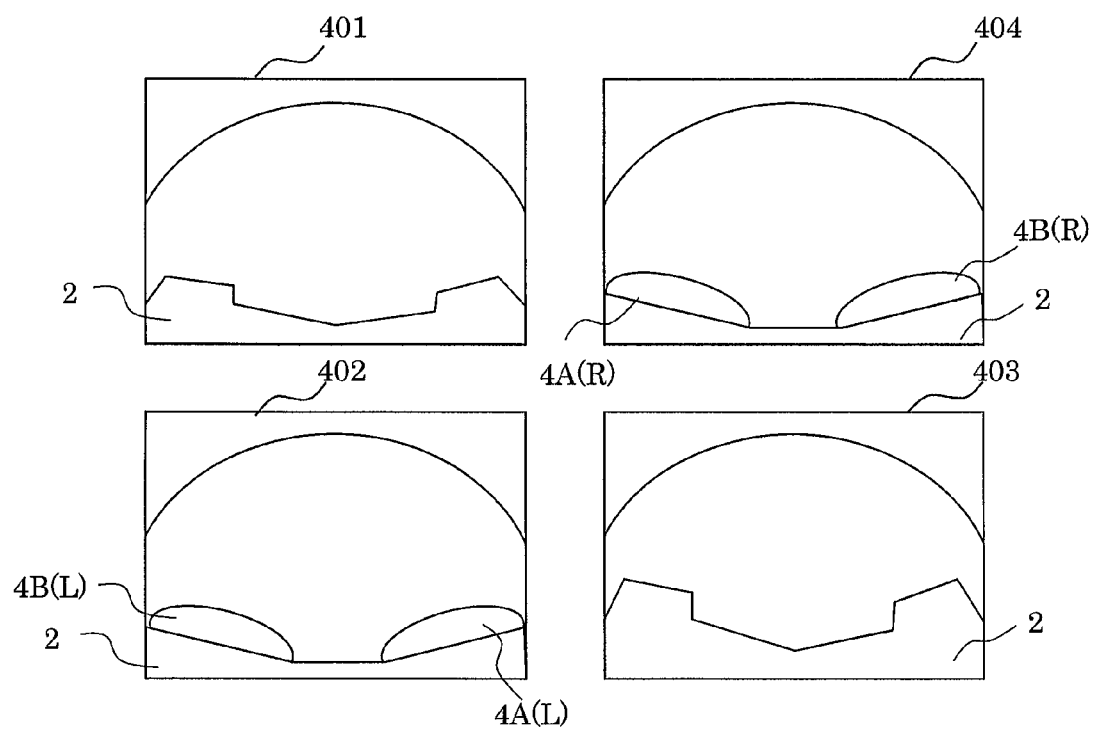
FIG. 3 is a set of conceptual views showing images acquired by the cameras making up part of the vehicle peripheral obstacle notification system as the first embodiment.

FIG. 2 is a conceptual view explaining the arrangement of cameras making up a surrounding image input part of the vehicle peripheral obstacle notification system as the first embodiment. FIG. 3 is a set of conceptual views showing images acquired by the cameras making up part of the vehicle peripheral obstacle notification system as the first embodiment.

In FIG. 2, the front side and the rear side of the vehicle body 2 of the dump truck 1 have a front side camera 301 and a rear side camera 303 for acquiring wide-angle images of the front and the rear of the dump truck 1, respectively. The left side and the right side of the vehicle body 2 are furnished with a left side camera 302 and a right side camera 304 for acquiring wide-angle images of the left and the right of the dump truck 1, respectively. These cameras 301 through 304 are mounted on the respective sides of the vehicle body 2 at a dipping angle so as to acquire mainly images of the respective ground surfaces. Also, a right front wheel 4A(R) and a right rear wheel 4B(R) are attached to the vehicle body 2 of the dump truck 1.

FIG. 3 shows typical surrounding images acquired by the cameras 301 through 304. Reference numeral 401 stands for a typical front side image acquired by the front side camera 301; 402 denotes a typical left side image acquired by the left side camera 302; 403 represents a typical rear side image acquired by the rear side camera 303; and 404 indicates a typical right side image acquired by the right side camera 304.

The surrounding images 401 through 404 are acquired as wide-angle images so that the landscape in the distance (i.e., horizon) looks curved in each image. Also, some of the nearby objects, such as part of the vehicle body 2, part of the right and left front wheels 4A(R) and 4A(L), and part of the right and left rear wheels 4B(R) and 4B(L) appear in the lower portion of each image. The front side image 401, left side image 402, rear side image 403, and right side image 404 are combined to make up the surrounding images for this embodiment.

Figure 4:
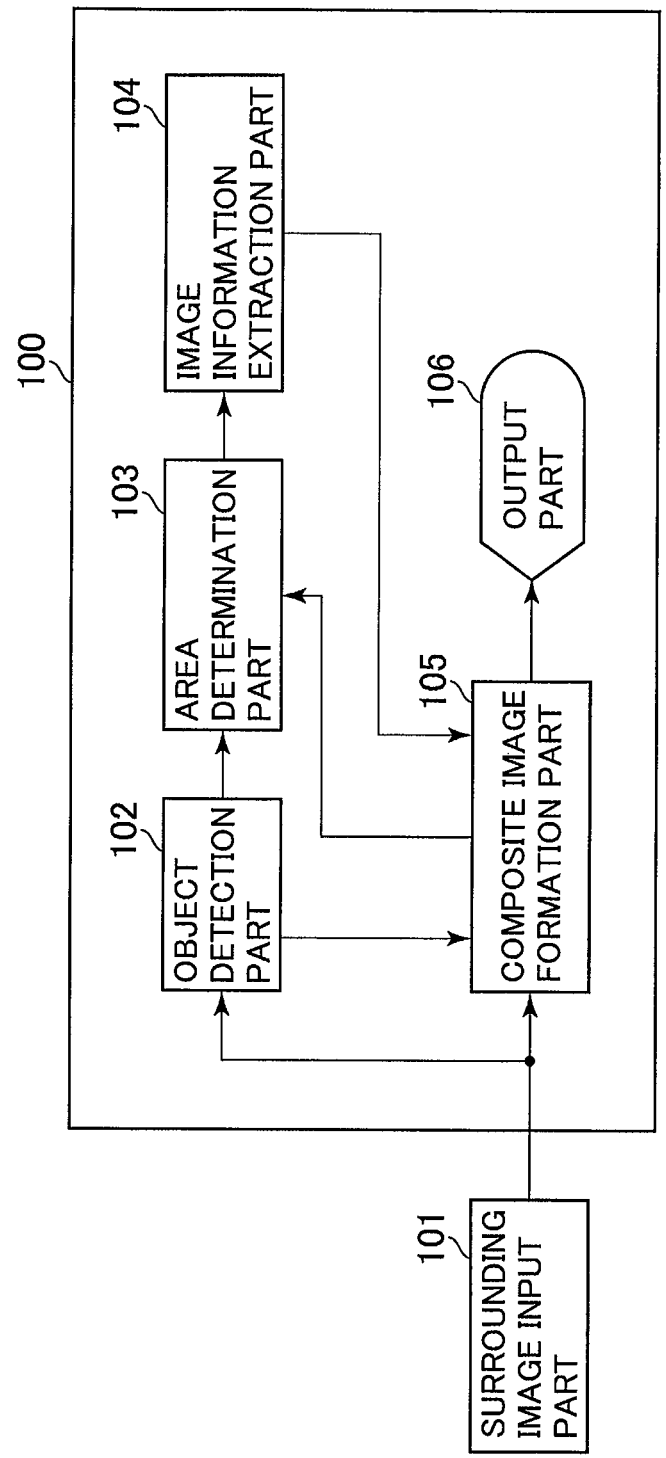
FIG. 4 is a block diagram showing a structure of the vehicle peripheral obstacle notification system as the first embodiment.

FIG. 4 is a block diagram showing a structure of the vehicle peripheral obstacle notification system implemented as the first embodiment. In FIG. 4, the vehicle peripheral obstacle notification system as the first embodiment includes a vehicle peripheral obstacle notification device 100 and a surrounding image input part 101.

The surrounding image input part 101 includes the multiple cameras 301 through 304 for acquiring images of the surroundings of the dump truck 1. The surrounding image input part 101 transmits the multiple surrounding images 401 through 404 acquired by the cameras to the vehicle peripheral obstacle notification device 100.

The vehicle peripheral obstacle notification device 100 includes an object detection part 102, an area determination part 103, an image information extraction part 104, a composite image formation part 105, and an output part 106.

The object detection part 102 performs a detection process on the multiple surrounding images 401 through 404 sent from the surrounding image input part 101 so as to determine whether there is a moving obstacle in the images. The object detection part 102 outputs the result of the detection to the area determination part 103 and composite image formation part 105.

When receiving a signal from the object detection part 102 indicating the detection of a moving obstacle, the area determination part 103 determines whether the moving obstacle is positioned inside or outside the image areas on the basis of position information such as the coordinates at which the moving obstacle is detected in a composite image from the composite image formation part 105. If the moving object is determined to be outside the image areas, the area determination part 103 outputs the coordinates of the detected position to the image information extraction part 104 along with the surrounding images.

On the basis of the coordinates of the detected position input from the area determination part 103, the image information extraction part 104 extracts the image corresponding to the detected position from the surrounding images. The image information extraction part 104 outputs the extracted image as a detection result extracted image to the composite image formation part 105 together with the coordinates of the detected position.

The composite image formation part 105 admits the multiple surrounding images 401 through 404 sent from the surrounding image input part 101, the signal from the object detection part 102 indicating the detection of the moving obstacle, and a detected position coordinate signal from the image information extraction part 104 indicating the position of the moving obstacle as well as the detection result extracted image. The composite image formation part 105 first converts the coordinate information about the detected moving obstacle into coordinates in a composite image, and outputs a signal representing the converted coordinates to the area determination part 103. The composite image formation part 105 then extracts necessary portions from the input surrounding images for generating a composite bird's-eye image, superimposes the extracted portions on the images following the coordinate conversion, composes an extracted image of the detected position of the obstacle based on the input coordinates of the detected position, and outputs the composite image thus obtained to the output part 106.

The output part 106 has a display unit that presents a user with the composite image input from the composite image formation part 105.

Figure 5:
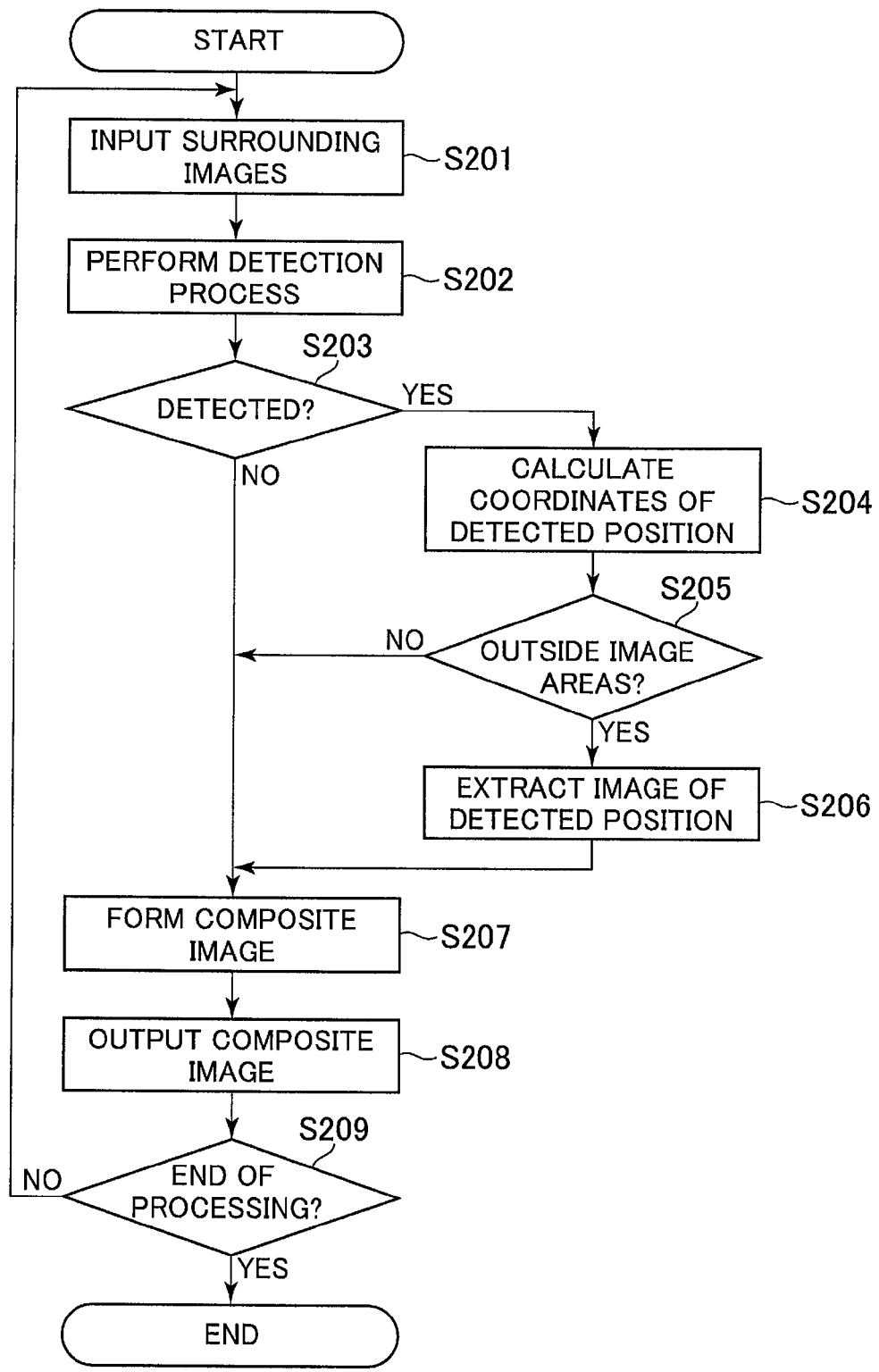
FIG. 5 is a flowchart showing processing steps performed by the vehicle peripheral obstacle notification system as the first embodiment.
Figure 6A:
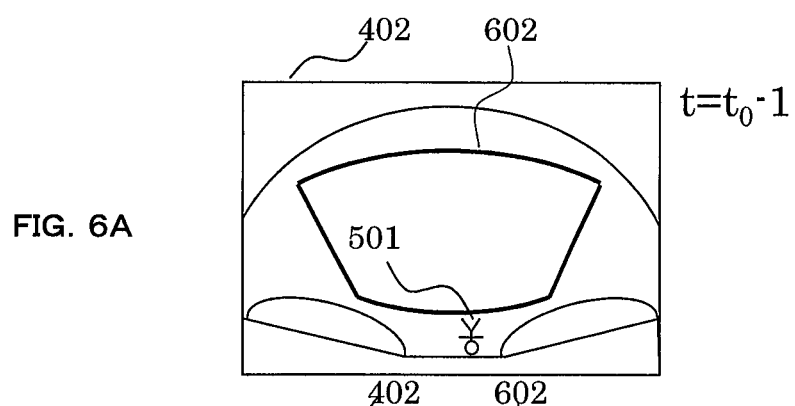
FIGS. 6A, 6B, 6C, and 6D are conceptual views showing an example in which a moving obstacle is detected by the vehicle peripheral obstacle notification system as the first embodiment.
Figure 6B:
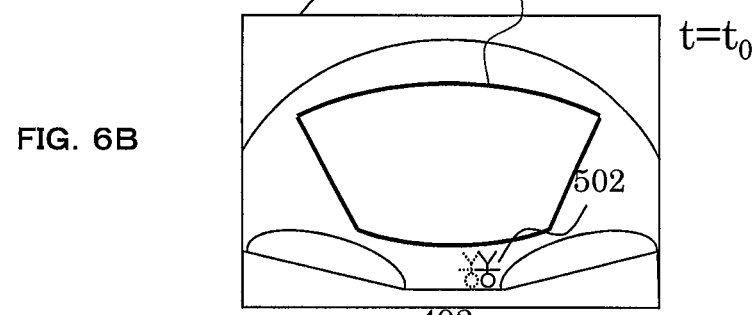
Figure 6C:
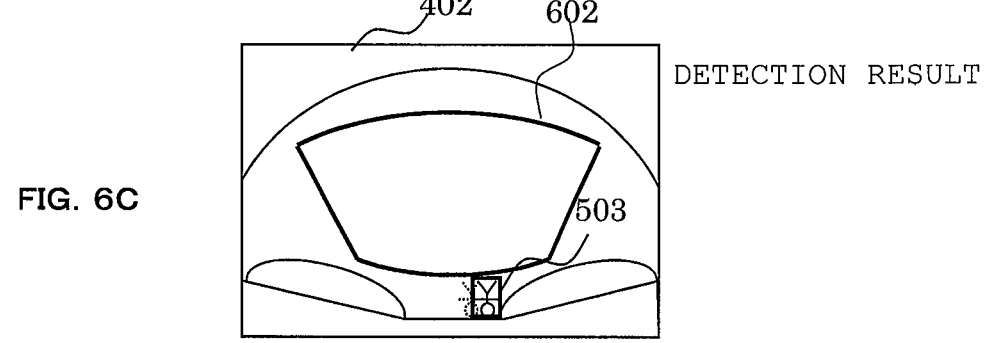
Figure 6D:
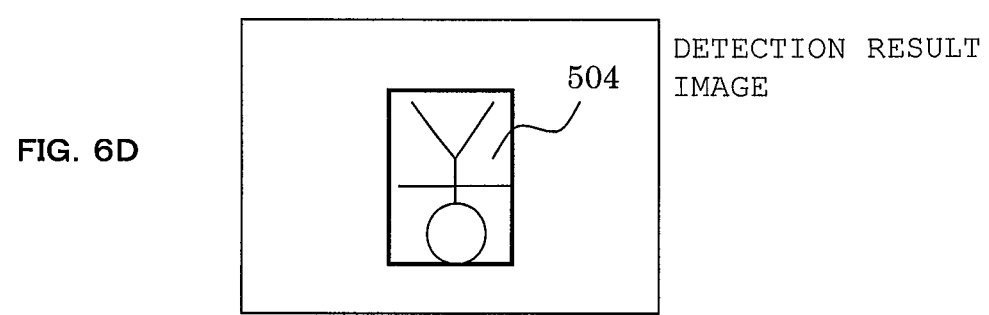
Figure 7:
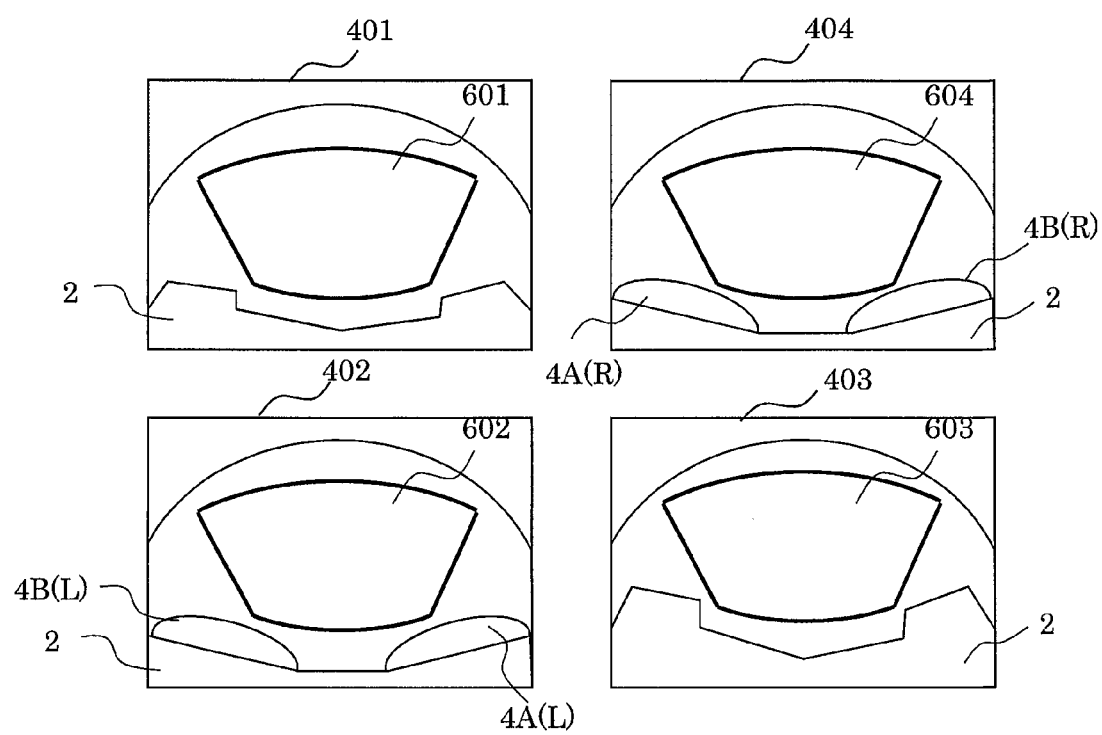
FIG. 7 is a set of conceptual views showing typical areas extracted from surrounding images acquired by the vehicle peripheral obstacle notification system as the first embodiment.
Figure 8:
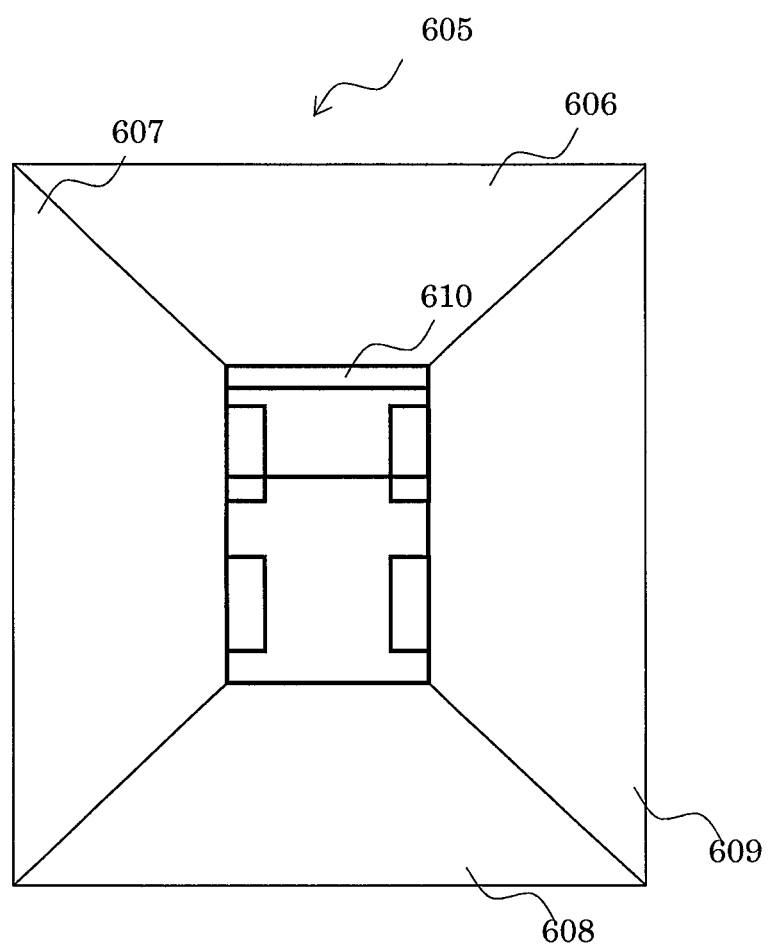
FIG. 8 is a conceptual view showing how a composite image is typically displayed by the vehicle peripheral obstacle notification system as the first embodiment.
Figure 9:
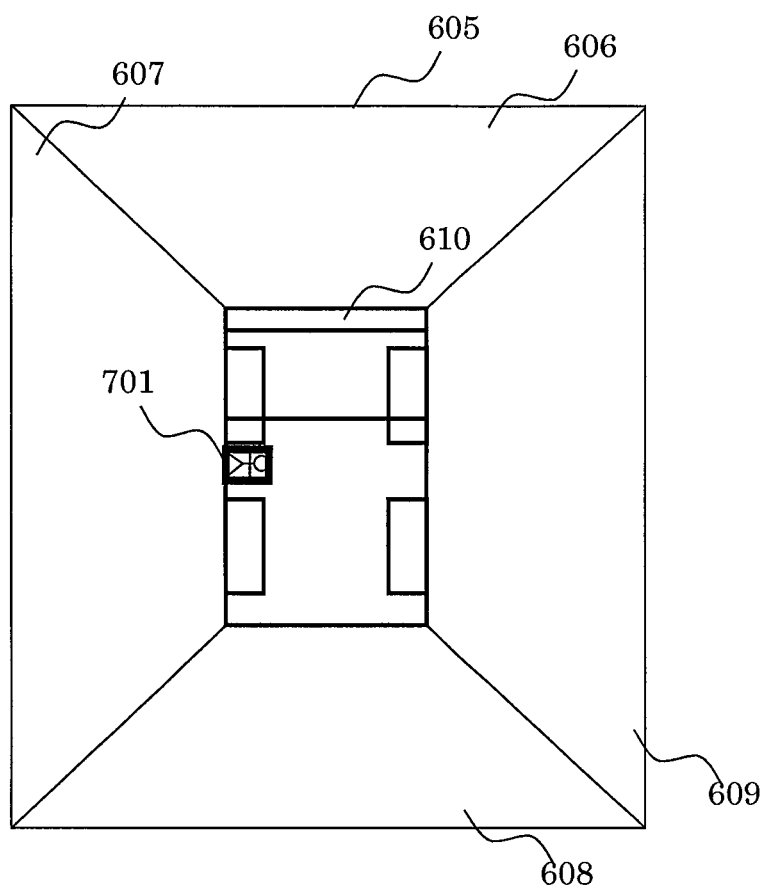
FIG. 9 is a conceptual view explaining how an obstacle outside the image areas is typically detected by the vehicle peripheral obstacle notification system as the first embodiment.

Explained next with reference to FIGS. 5 through 9 are the details of the processing for detecting and displaying the moving obstacle carried out by the vehicle peripheral obstacle notification system as the first embodiment of this invention. FIG. 5 is a flowchart showing processing steps performed by the vehicle peripheral obstacle notification system as the first embodiment. FIGS. 6A, 6B, 6C, and 6D are conceptual views showing an example in which a moving obstacle is detected by the vehicle peripheral obstacle notification system as the first embodiment. FIG. 7 is a set of conceptual views showing typical areas extracted from the surrounding images acquired by the vehicle peripheral obstacle notification system as the first embodiment. FIG. 8 is a conceptual view showing how a composite image is typically displayed by the vehicle peripheral obstacle notification system as the first embodiment. FIG. 9 is a conceptual view explaining how an obstacle outside the image areas is typically detected by the vehicle peripheral obstacle notification system as the first embodiment. In FIGS. 5 through 9, the same reference numerals denote the same or corresponding components in FIGS. 1 through 4, so that their detailed explanations will be omitted hereunder.

In FIG. 5, the vehicle peripheral obstacle notification device 100 inputs surrounding images in step S201. Specifically, the vehicle peripheral obstacle notification device 100 inputs the surrounding images 401 through 404 acquired by the surrounding image input part 101.

The vehicle peripheral obstacle notification device 100 performs the process of detecting an obstacle in step S202. Specifically, the object detection part 102 shown in FIG. 4 performs the process of detecting a moving obstacle. The images targeted for detection are the front side image 401, left side image 402, rear side image 403, and right side image 404 input from the surrounding image input part 101.

An example of the detection process is explained below with reference to FIGS. 6A through 6D. FIGS. 6A through 6D depict a typical detection process in which an obstacle is detected from the left side image 402. FIG. 6A is an image acquired at time t0-1 earlier than a specific time t0; FIG. 6B is an image acquired at the specific time t0; FIG. 6C is an image indicative of the result of obstacle detection; and FIG. 6D is a detection result image.

Here, FIG. 6A shows an obstacle 501 being imaged in the left side image 402 at time t0-1, and FIG. 6B indicates an obstacle 502 being imaged in the left side image 402 at the specific time t0. The obstacles 501 and 502 are in fact the same person. The left side camera 302 has acquired an image of the obstacle moving over time. FIGS. 6A through 6C show that the person as the obstacle is standing between the front wheel 4A(L) and the rear wheel 4B(L). The image acquired in this situation shows the person with his head oriented downward in the image and his legs oriented upward. The head is shown proportionally larger than the legs because the head is positioned closer to the camera.

The object detection part 102 in FIG. 4 compares these images input from the surrounding image input part 101 to calculate the portion where changes have occurred in the images over time. A detection result 503 obtained through the calculation and indicated in FIG. 6C as positioned outside the extracted areas (to be discussed later) retains the coordinate information relevant to the left side image 402. If no changes have occurred in the images, the above detection result is not acquired.

Returning to FIG. 5, the vehicle peripheral obstacle notification device 100 determines in step S203 whether a moving object is detected in the detection process of step S202. If the moving object is determined to be detected, step S204 is reached; otherwise step S207 is reached.

The vehicle peripheral obstacle notification device 100 calculates the coordinates of the detected position in step S204. Specifically, the object detection part 102 shown in FIG. 4 converts the position of the moving obstacle acquired in the front side image 401, left side image 402, rear side image 403, and right side image 404 into coordinate information, and outputs a signal representative of the coordinate information to the composite image formation part 105. The composite image formation part 105 converts the input signal so as to calculate the coordinate information for a composite image. This conversion is the same as the process of forming the composite image in step S207, to be discussed later. Specifically, portions of the front side image 401, left side image 402, rear side image 403, and right side image 404 are extracted and arranged in such a manner that their boundaries are contiguous with one another allowing the surroundings of the dump truck (host vehicle) 1 to be displayed.

This example is further explained with reference to FIGS. 7 and 8. A front side extracted area 601, a left side extracted area 602, a rear side extracted area 603, and a right side extracted area 604 are established, respectively, in the surrounding images 401 through 404 shown in FIG. 7. These extracted areas are delineated on the basis of wide-angle camera characteristics and in such a manner that portions over a predetermined distance starting from immediately under the dump truck 1 are included in the images and that the extracted area in the image input from a given camera and the extracted area in the image input from the adjacent camera are contiguous with each other without overlaps.

The extracted areas 601 through 604 are then subjected to coordinate conversion and image composition so as to form a composite image 605 shown in FIG. 8. Within the composite image 605 of FIG. 8, the front side extracted area 601 is converted to a front side converted image 606. Likewise, the left side extracted area 602 is converted to a left side converted image 607, the rear side extracted area 603 to a rear side converted image 608, and the right side extracted area 604 to a right side converted image 609.

In the composite image 605, the converted images 606 through 609 are arranged successively to be contiguous with each other. With this embodiment, the composite image 605 is a bird's-eye view of the surroundings of the dump truck 1. In the portion where there is no image resulting from the coordinate conversion and image arrangement, a host vehicle icon 610 is composed in order to give the user a clear indication of the area in which the dump truck (host vehicle) 1 is located.

Returning to FIG. 5, the vehicle peripheral obstacle notification device 100 determines in step S205 whether the coordinates of the detected position in step S204 are outside the areas of the converted images. Specifically, the area determination part 103 determines whether the position of the moving obstacle is inside or outside the image areas on the basis of the position information including the detected position coordinates of the moving obstacle in the composite image from the composite image formation part 105. If the moving obstacle is determined to be outside the areas of the converted images, step S206 is reached; otherwise step S207 is reached.

With this embodiment, as shown in FIG. 6C, the image 503 indicative of the detection result outside the extracted areas is positioned inside the left side image 402 but outside the left side extracted area 602. When the coordinate information about the image is converted, the converted coordinate information points to the outside of the left side converted image 607 shown in FIG. 8.

Returning to FIG. 5, the vehicle peripheral obstacle notification device 100 extracts the image of the detected position in step S206. Specifically, from among the images yet to be converted, the image information extraction part 104 extracts the image covering the portion corresponding to the detected position. With this embodiment, the image information extraction part 104 extracts a detection result image 504 outside the extracted area and corresponding to the detection result 503 that is inside the left side image 402 and outside its extracted area in FIG. 6D. The detection result image 504 thus extracted is retained by the composite image formation part 105.

If no moving obstacle is detected in step S203, if the moving obstacle is not found outside the areas of the converted images, or after the process of step S206 is carried out, the vehicle peripheral obstacle notification device 100 forms the composite image in step S207. Specifically, step S207 is the process of forming the composite image as in the above-mentioned step S204. Portions of the front side image 401, left side image 402, rear side image 403, and right side image 404 are extracted, subjected to coordinate conversion, and arranged by the composite information formation part 105 in such a manner that their boundaries are contiguous with one another, thereby allowing the surroundings of the dump truck (host vehicle) 1 to be displayed.

Here, the processing by the composite image formation part 105 following the execution of step S206 is different from the processing in other cases. If it is determined in step S203 that the moving obstacle is detected, this system retains the coordinate information from the detection result. Also, if it is determined in step S205 that the coordinates of the detection result are outside the image areas, this system retains the detection result image 504 shown in FIG. 6D. To present such information to the user, the composite image formation part 105 sets highlight display to the composite image 605 shown in FIG. 9.

Specifically, the composite image formation part 105 converts the detection result 503 outside the extracted area in FIG. 6C, and sets the detection result image 504 outside the extracted area at the converted coordinates. This allows the composite image 605 shown in FIG. 9 to be superimposed with an image 701 in which the detection result outside the extracted area is arranged. If it is determined in step S205 that the coordinates of the detection result are inside the image area, another type of highlight display such as the rendering of a rectangle is made in that position, and the detection result image 504 outside the extracted area is not used. This makes it possible to notify the user of the presence, by highlight display, of the moving obstacle not appearing in the composite image 605.

Returning to FIG. 5, the vehicle peripheral obstacle notification device 100 outputs the composite image in step S208. Specifically, the composite image formation part 105 outputs the composite image 605 to the output part 106. If the moving obstacle has been detected in the above-described process, what is output to the output part 106 is a highlighted composite image 605 such as the detection result 701 following the coordinate conversion.

In step S209, the vehicle peripheral obstacle notification device 100 determines whether the detection and the output of the moving obstacle are completed. If it is determined that these processes are completed, the vehicle peripheral obstacle notification device 100 terminates its processing; otherwise the vehicle peripheral obstacle notification device 100 returns to step S201.

When this embodiment performs the detection and notification of the moving obstacle in the manner described above, the user can be notified of what kind of obstacle is detected at what location. The details of the notification prompt the user to determine quickly what to do next in carrying out the work involved.

According to the vehicle peripheral obstacle notification system as the first embodiment of the present invention, it is possible to detect, without recourse to an onboard under-vehicle camera, a moving obstacle at a location not appearing in a composite bird's-eye view covering the surroundings of the host vehicle 1 including a view immediately under the vehicle body of the host vehicle 1, the position and an image of the moving obstacle being superimposed onto a display screen prompting the user to know quickly what kind of obstacle is detected at what location. This allows the user easily to determine how to deal with the detected moving obstacle. As a result, the efficiency of the entire work being done is improved.

Second Embodiment

Figure 10:
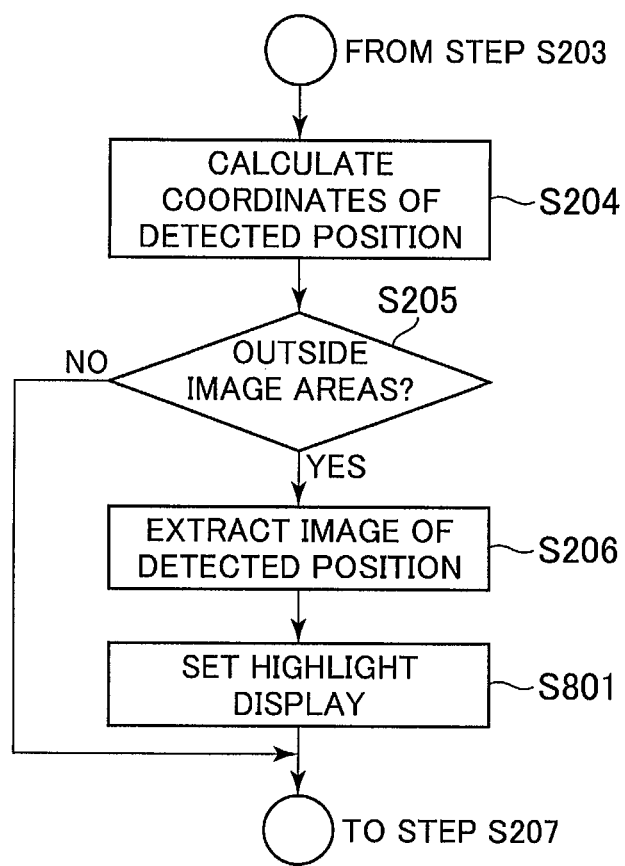
FIG. 10 is a flowchart showing the processing steps for highlight display performed by a vehicle peripheral obstacle notification system as a second embodiment of the present invention.
Figure 11:
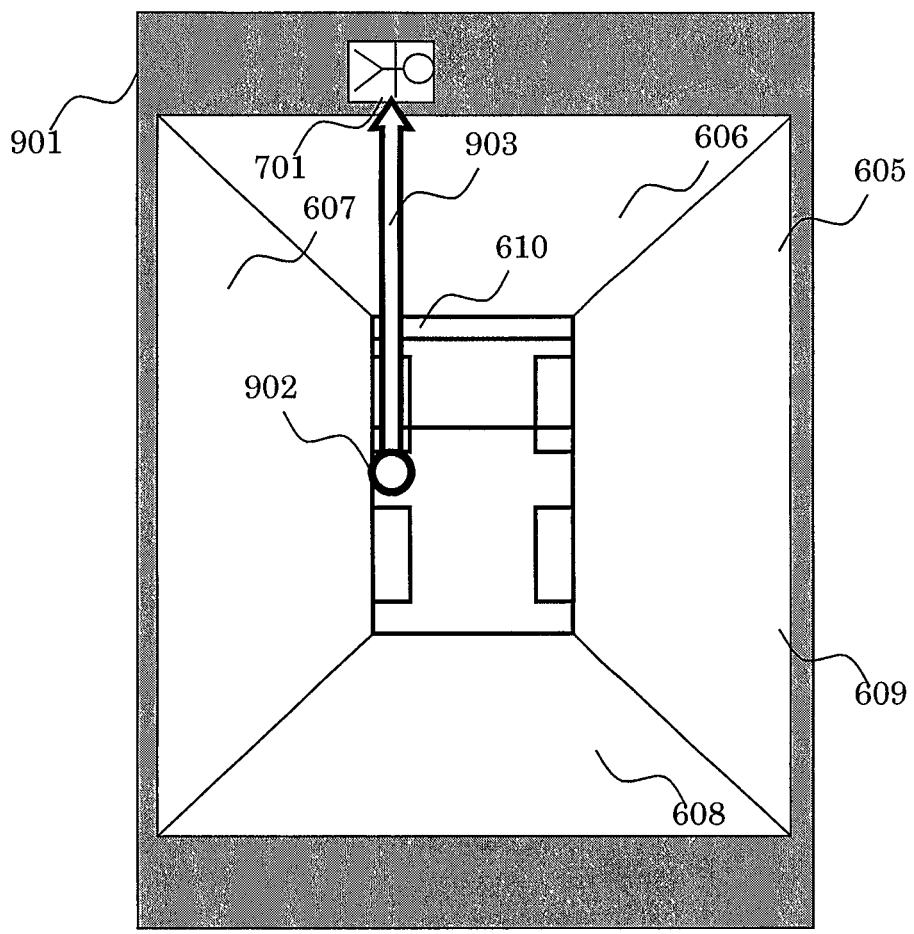
FIG. 11 is a conceptual view explaining how an obstacle outside the image areas is typically detected by the vehicle peripheral obstacle notification system as the second embodiment.

A vehicle peripheral obstacle notification system as the second embodiment of the present invention is explained below with reference to the accompanying drawings. FIG. 10 is a flowchart showing the processing steps for highlight display performed by the vehicle peripheral obstacle notification system as the second embodiment. FIG. 11 is a conceptual view explaining how an obstacle outside the image areas is typically detected by the vehicle peripheral obstacle notification system as the second embodiment. In FIGS. 10 and 11, the same reference numerals denote the same or corresponding components in FIGS. 1 through 9, so that their detailed explanations will be omitted hereunder.

The structure and the manner of operation of the vehicle peripheral obstacle notification system as the second embodiment are substantially the same as those of the first embodiment. The second embodiment differs from the first embodiment as follows: if a moving object is detected which is under the host vehicle 1 and which does not appear in the composite image 605, the detected position is highlighted, and the image of the detection result (i.e., image of the obstacle) is indicated to the user by a lead line going out of the host vehicle icon 610 and composite image 605. The flow of the processing by the second embodiment is similar to what is shown in FIG. 5 but differs where another step is added after step S206. This difference is explained below with reference to FIG. 10.

In FIG. 10, if a moving obstacle is detected in step S203 and if the coordinates of the detection result are determined to be outside the image areas in step S205, then step S206 is carried out followed by step S801 in which highlight display is set so as to present the user with the detection result image 504 outside the extracted areas retained by this system.

Specifically, the composite image 605 or the like shown in FIG. 11 is output to the output part 106. As illustrated in FIG. 11, a display surplus area 901 exists in the periphery of the composite image 605. The display surplus area 901 is an area not used to display images due to such reasons as the need to maintain the proper aspect ratio for image display. Usually, nothing is displayed in the display surplus area 901.

With the second embodiment, the composite image formation part 105 converts in step S801 the detection result 503 outside the extracted area, and sets highlight display 902 of the detected position at the converted coordinates. In this example, a circle is drawn with a thick solid line for highlight display.

Then the composite image formation part 105 searches the display surplus area 901 for an area which is closest to the position where the highlight display 902 of the detected position is located and which is sufficiently wide to render the detection result image 504 outside the extracted area. The rendering of a connecting arrow 903 is established up to the position found by the search. In this example, the connecting arrow 903 is indicated up to a position above the composite image 605.

Next, the rendering of the image 701 in which the detection result outside the extracted area is arranged is set to the position found by the search. As a result of this, even if the detection result image 504 outside the extracted area is similar in color and shape to the host vehicle icon 610 for example, the detection result image 504 outside the extracted area is indicated in the display surplus area 901. The characteristics such as color and shape of the detection result image 504 outside the extracted area are highlighted and thus clearly recognizable. This prompts the user quickly to determine what to do next and improves the efficiency of the work as a whole.

With the second embodiment, the position of the moving obstacle is displayed where it is detected, but the image of the detected obstacle is displayed at a position different from the detected position.

The above-described vehicle peripheral obstacle notification system as the second embodiment of the invention provides substantially the same effects as the first embodiment explained above.

Furthermore, the above-described vehicle peripheral obstacle notification system as the second embodiment allows the user to recognize the detection result image (image of the obstacle) 504 in the display surplus area 901. As a result of this, even if the detection result image 504 is similar in color and shape to the host vehicle icon 610, the color and shape of the detection result image 504 are highlighted and thus clearly recognizable. This makes it possible to ensure safety better than before.

Third Embodiment

Figure 12:
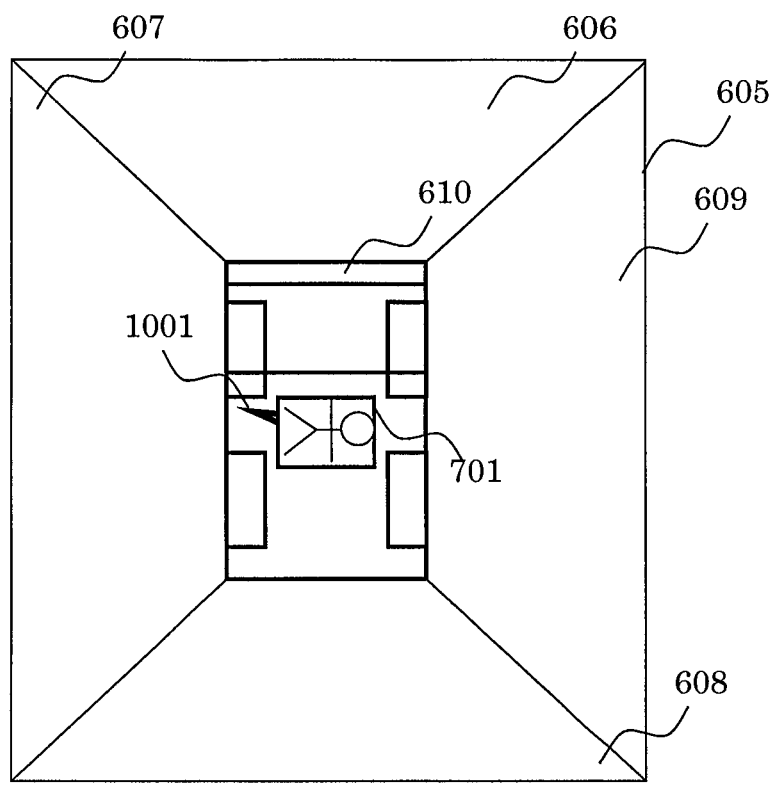
FIG. 12 is a conceptual view explaining how an obstacle outside the image areas is typically detected by a vehicle peripheral obstacle notification system as a third embodiment of the present invention.

A vehicle peripheral obstacle notification system as the third embodiment of the present invention is explained below with reference to the accompanying drawings. FIG. 12 is a conceptual view explaining how an obstacle outside the image areas is typically detected by the vehicle peripheral obstacle notification system as the third embodiment. In FIG. 12, the same reference numerals denote the same or corresponding components in FIGS. 1 through 11, so that their detailed explanations will be omitted hereunder.

The structure and the manner of operation of the vehicle peripheral obstacle notification system as the third embodiment are substantially the same as those of the first embodiment. The third embodiment differs from the first embodiment as follows: if a moving object is detected which is under the host vehicle 1 and which does not appear in the composite image 605, the detected position is highlighted, and the image of the detection result (i.e., image of the obstacle) is indicated to the user as an image displayed at the center of the host vehicle icon 610. The flow of the processing by the third embodiment is similar to what is shown in FIG. 11 but differs in terms of the details in step S801. This difference is explained below.

When highlight display is set in step S801, the composite image 605 such as one shown in FIG. 12 is output to the output part 106. Specifically, the composite image formation part 105 converts the detection result 503 outside the extracted area, and sets highlight display at the converted coordinates for clearly indicating the detected position. In this example, an arrow 1001 pointing to the detected position is displayed from around the center of the host vehicle icon 610 toward the converted coordinates.

Next, at the center of the host vehicle icon 610, the composite image formation part 105 sets the rendering of the image 701 in which the detection result outside the extracted area is arranged. If multiple moving obstacles are detected, this process is applied to the most recently detected moving obstacle. As a result of this, if the position at which the moving obstacle is detected is outside the areas of the converted images, simply looking at the host vehicle icon 610 enables the user always to find the image 701 in which the detection result outside the extracted areas is arranged. The user is thus allowed to minimize the movement of the point of view and thereby understand the situation quickly.

With the third embodiment, the position of the moving obstacle is displayed where it is detected, but the image of the detected obstacle is displayed at a position different from the detected position.

The above-described vehicle peripheral obstacle notification system as the third embodiment of the invention provides substantially the same effects as the first embodiment explained above.

Furthermore, the above-described vehicle peripheral obstacle notification system as the third embodiment enables the user to minimize the movement of the point of view when finding the image of the moving obstacle. As a result, the user can understand the situation quickly and ensure safety better than before.

Fourth Embodiment

Figure 13:
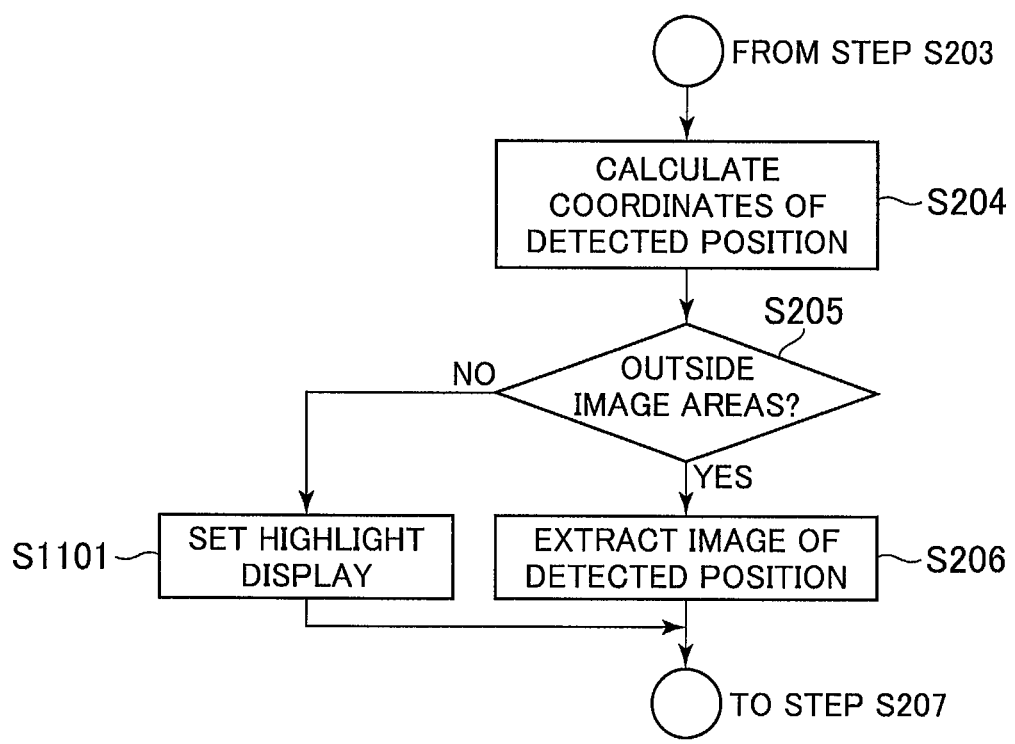
FIG. 13 is a flowchart showing the processing steps for highlight display performed by a vehicle peripheral obstacle notification system as a fourth embodiment of the present invention.
Figure 14:
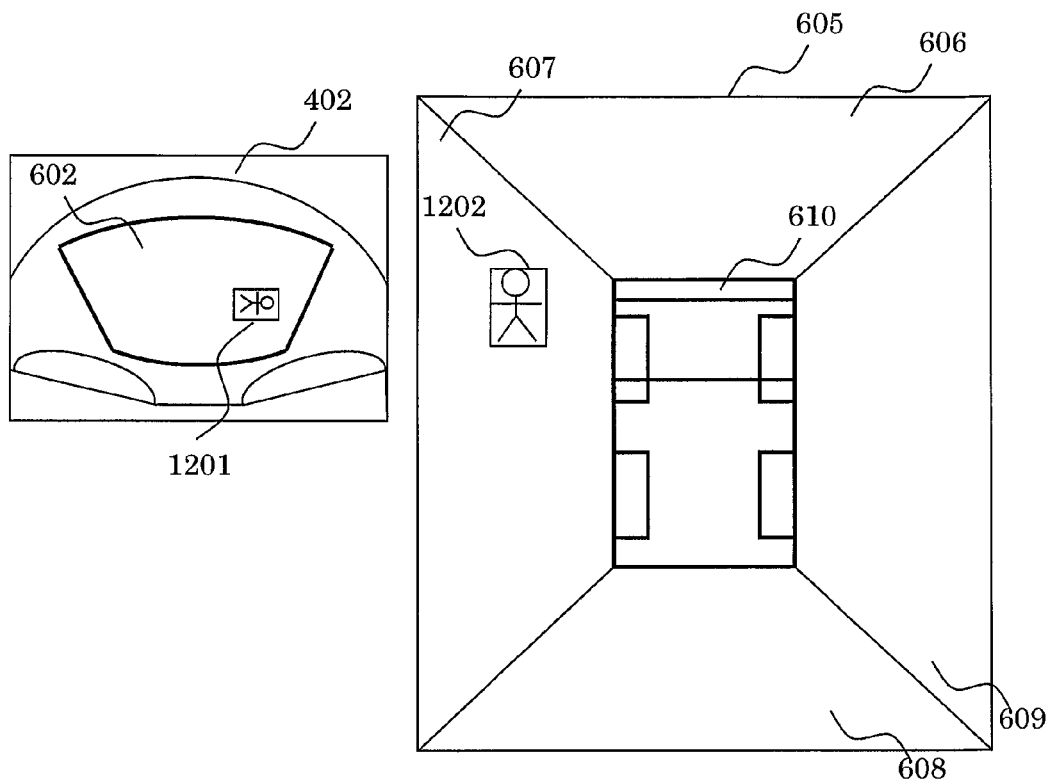
FIG. 14 is a set of conceptual views explaining how an obstacle inside the image areas is typically detected by the vehicle peripheral obstacle notification system as the fourth embodiment.

A vehicle peripheral obstacle notification system as the fourth embodiment of the present invention is explained below with reference to the accompanying drawings. FIG. 13 is a flowchart showing the processing steps for highlight display performed by the vehicle peripheral obstacle notification system as the fourth embodiment. FIG. 14 is a set of conceptual views explaining how an obstacle inside the image areas is typically detected by the vehicle peripheral obstacle notification system as the fourth embodiment. In FIGS. 13 and 14, the same reference numerals denote the same or corresponding components in FIGS. 1 through 12, so that their detailed explanations will be omitted hereunder.

The structure and the manner of operation of the vehicle peripheral obstacle notification system as the fourth embodiment are substantially the same as those of the first embodiment. The fourth embodiment differs from the first embodiment as follows: if a moving obstacle is detected in an area appearing in the composite image 605, an image of the detection result (i.e., image of the obstacle) yet to be subjected to coordinate conversion is displayed for notification to the user. The flow of the processing by the fourth embodiment is similar to what is shown in FIG. 5 but differs where another step is added after step S206. This difference is explained below with reference to FIG. 13.

In FIG. 13, if a moving obstacle is detected in step S203 and if the coordinates of the detection result are determined to be inside the image areas in step S205, step S1101 is carried out to set highlight display so that the user is presented with the detection result image in effect before application of the coordinate conversion and retained by this system.

Specifically, on the basis of the left side image 402 shown on the left in FIG. 14, the composite image 605 indicated on the right in FIG. 14 is formed. In this example, the moving obstacle is inside the left side extracted area 602 and is shown as a detection result 1201 inside the extracted area. With the other embodiments discussed above, the detection result is subjected to coordinate conversion in step S207 in which the composite image is formed, and the result of the conversion is displayed on the output part 106. In this example, by contrast, coordinate conversion is not applied; the detection result is set within the composite image 605 as a detection result image 1202 inside the extracted area.

That makes it possible to set within the composite image 605 the detection result image similar in appearance to the image 701 in which the detection result outside the extracted areas is arranged. The user thus has less trouble in grasping the detection result. When the user is presented with the image not undergoing coordinate conversion, it is possible to display an image closely reflecting the state actually observed from where the camera is located. This allows the user easily to understand the situation on site.

The above-described vehicle peripheral obstacle notification system as the fourth embodiment of the invention provides substantially the same effects as the first embodiment explained above.

Furthermore, the above-described vehicle peripheral obstacle notification system as the fourth embodiment enables the user to recognize the image closely reflecting the state actually observed from where the camera is located. As a result, the user can understand the situation on site quickly and ensure safety better than before.

Fifth Embodiment

Figure 15:
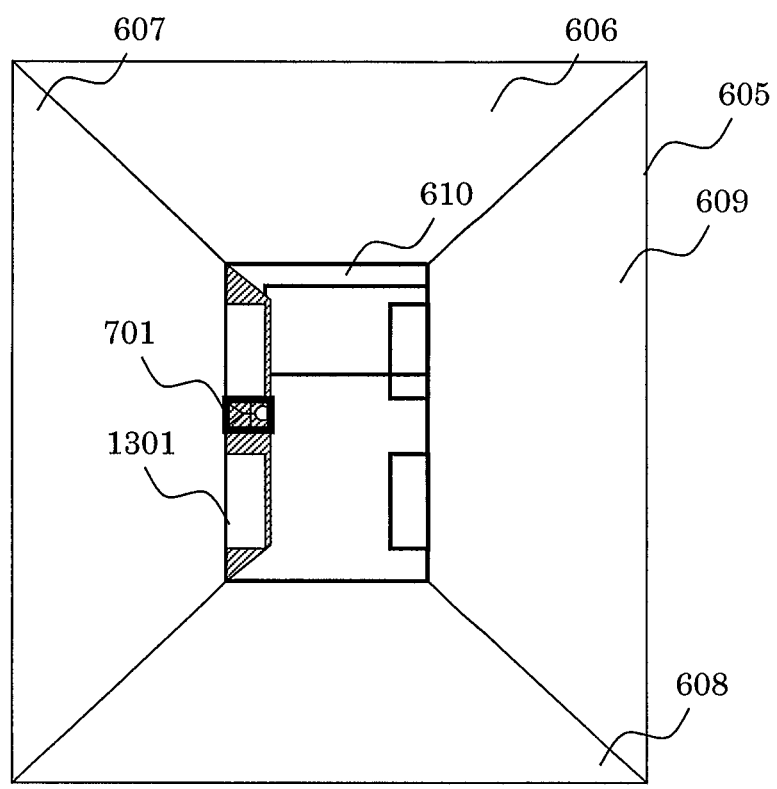
FIG. 15 is a conceptual view explaining how an obstacle under the host vehicle body is typically detected by a vehicle peripheral obstacle notification system as a fifth embodiment of the present invention.

A vehicle peripheral obstacle notification system as the fifth embodiment of the present invention is explained below with reference to the accompanying drawings. FIG. 15 is a conceptual view showing typical display of a composite bird's-eye image and a detected moving obstacle given by the vehicle peripheral obstacle notification system as the fifth embodiment. In FIG. 15, the same reference numerals denote the same or corresponding components in FIGS. 1 through 14, so that their detailed explanations will be omitted hereunder.

The structure and the manner of operation of the vehicle peripheral obstacle notification system as the fifth embodiment are substantially the same as those of the first embodiment. The fifth embodiment differs from the first embodiment as follows: if a moving object is detected which is under the host vehicle 1 and which does not appear in the composite image 605, a partial area under the host vehicle 1 is shown superimposed on the host vehicle icon 610, along with the image of the detection result (i.e., image of the obstacle) for notification to the user. The flow of the processing by the fifth embodiment is similar to what is shown in FIG. 11 but differs in terms of the details of step S801. This difference is explained below.

When highlight display is set in step S801, the composite image 605 such as one shown in FIG. 15 is output to the output part 106. Specifically, the composite image formation part 105 converts the detection result 503 outside the extracted area, and sets highlight display for clearly indicating the detected position at the converted coordinates. In this example, the image 701 in which the detection result outside the extracted areas is arranged is displayed supplemented with a detection result surrounding image 1301 (shown shaded) indicating the surroundings of the detected position.

The detection result surrounding image 1301 may be an image under the host vehicle 1 included in the image containing the detected moving obstacle, for example. In this case, the detection result surrounding image 1301 corresponds to the portions other than the left side extracted area 602 within the left side image 402 shown in FIG. 7. Inside the left side image 402, the underside of the host vehicle 1 is located apparently at the bottom of the left side extracted area 602. An image of this portion can thus be utilized in FIG. 15.

As the detection result surrounding image 1301, either the image yet to be subjected to coordinate conversion or the image having undergone coordinate conversion may be set. Because the detection result and the situation of the surroundings can be displayed side by side, the user can easily estimate the cause and the future behavior of the detection result.

The above-described vehicle peripheral obstacle notification system as the fifth embodiment of the invention provides substantially the same effects as the first embodiment explained above.

Furthermore, the above-described vehicle peripheral obstacle notification system as the fifth embodiment enables the user easily to estimate the cause and the future behavior of the detected moving obstacle. As a result, the user can understand the situation quickly and ensure safety better than before.

Sixth Embodiment

Figure 16:
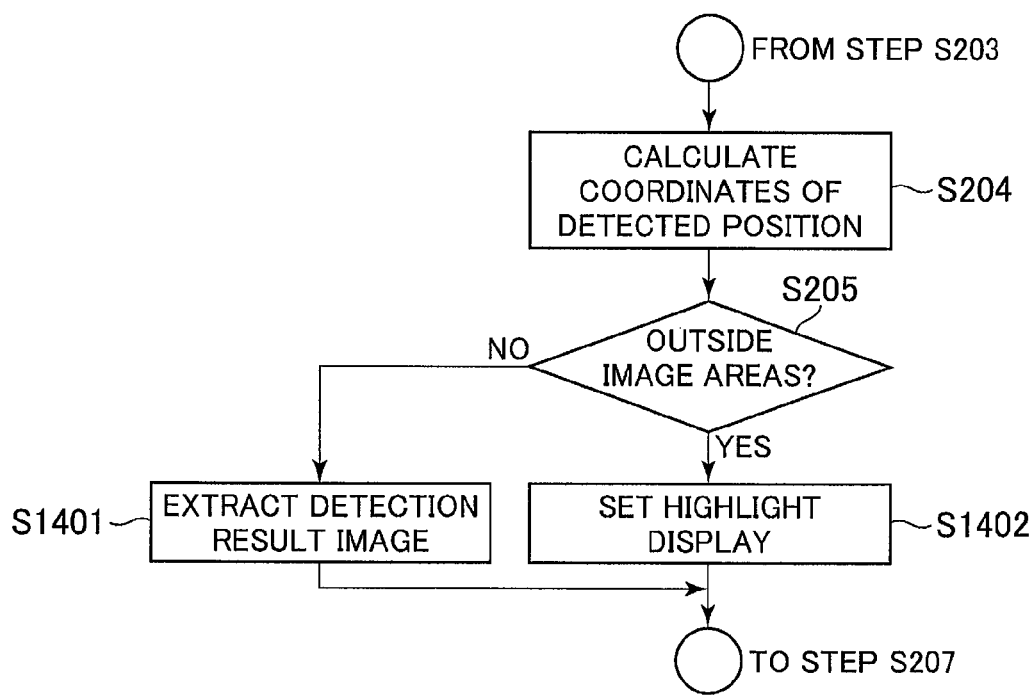
FIG. 16 is a flowchart showing the processing steps for highlight display performed by a vehicle peripheral obstacle notification system as a sixth embodiment of the present invention.
Figure 17:
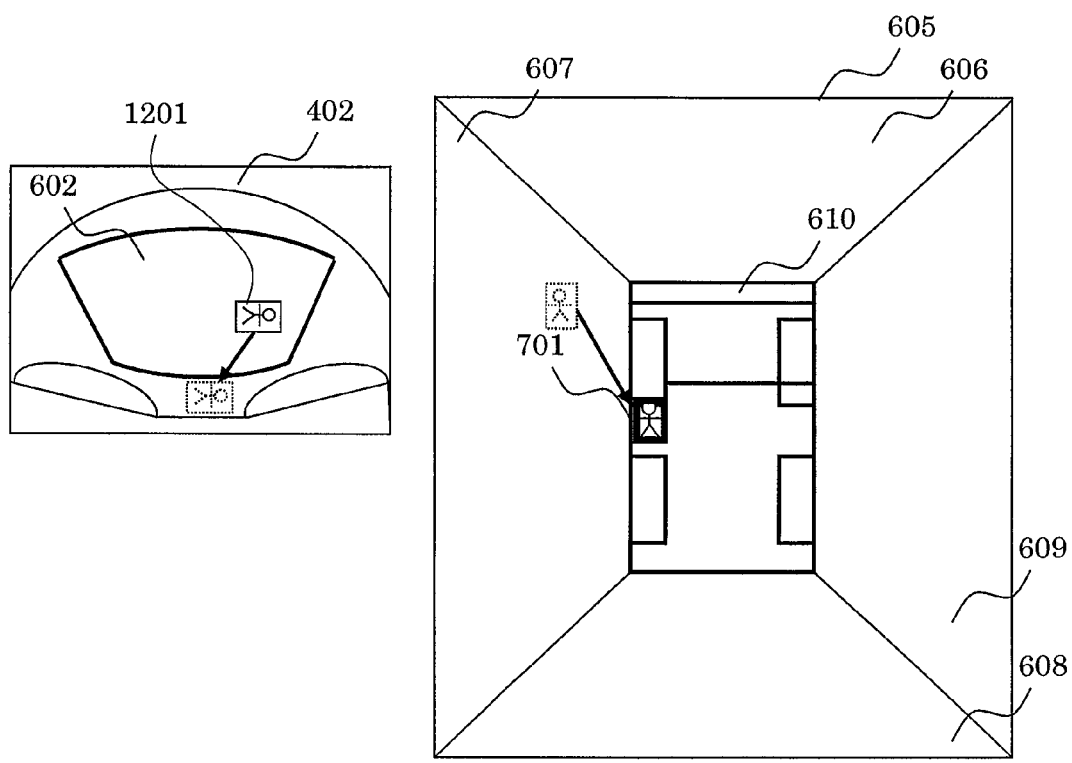
FIG. 17 is a set of conceptual views explaining how an obstacle moving from the surroundings of the host vehicle to under the host vehicle body is typically detected by the vehicle peripheral obstacle notification system as the sixth embodiment.

A vehicle peripheral obstacle notification system as the sixth embodiment of the present invention is explained below with reference to the accompanying drawings. FIG. 16 is a flowchart showing the processing steps for highlight display performed by the vehicle peripheral obstacle notification system as the sixth embodiment. FIG. 17 is a set of conceptual views explaining how an obstacle inside the image areas is typically detected by the vehicle peripheral obstacle notification system as the sixth embodiment. In FIGS. 16 and 17, the same reference numerals denote the same or corresponding components in FIGS. 1 through 15, so that their detailed explanations will be omitted hereunder.

The structure and the manner of operation of the vehicle peripheral obstacle notification system as the sixth embodiment are substantially the same as those of the first embodiment. The sixth embodiment differs from the first embodiment as follows: if the moving object detected in the surroundings of the host vehicle 1 has moved under the host vehicle 1, an image acquired in the vehicle surroundings (i.e., image of the obstacle) is displayed at the under-vehicle location where there is the moving obstacle, for notification to the user. The flow of the processing by the sixth embodiment is similar to what is shown in FIG. 5 but differs where another step is added after step S205. This difference is explained below with reference to FIG. 16.

In FIG. 16, if a moving obstacle is detected in step S203 and if the coordinates of the detection result are determined to be inside the image areas in step S205, step S1401 is carried out as a process to extract and retain a detection result image. If the coordinates of the detection result are determined to be outside the image areas in step S205, step S206 is replaced with step S1402 in which highlight display is set to present the user with the detection result image inside the image areas retained by this system.

Specifically, shown on the left in FIG. 17 is the left side image 402 in effect when the moving obstacle is still inside the left side extracted area 602 that is the image area; on the right in FIG. 17 is the composite image in effect when the moving obstacle later moved out of the image area.

If the moving object inside the image area is detected at a given point in time, step S1401 is carried out as a process to extract the detection result image. Specifically, the detection result 1201 inside the extracted area shown on the left in FIG. 17 is acquired, and is retained by the image information extraction part 104. Thereafter, when the moving object has moved under the host vehicle 1, the moving obstacle moves from inside the image area to the outside. At this time, the result of the determination of step S205 in FIG. 16 is changed, and step S1402 is carried out as a process to set highlight display.

Specifically, as shown on the right in FIG. 17, the image 701 is displayed in which the detection result outside the extracted area is displayed superimposed on the host vehicle icon 610. The image used here was acquired in step S1401 and has been retained by the image information extraction part 104.

Because it is possible to display an image closely reflecting the state of the moving obstacle visibly recognizable by the user's naked eye, the user can easily understand the situation on site. The image thus acquired is expected to be higher in brightness than if the detection result image is acquired from under the host vehicle 1 where incident light is less than in the surroundings, so that the images acquired from the underside are expected to be relatively dark. The display therefore allows the user easily to grasp the behavior of the moving obstacle even if the obstacle has moved under the host vehicle 1.

The above-described vehicle peripheral obstacle notification system as the sixth embodiment of the invention provides substantially the same effects as the first embodiment explained above.

Furthermore, the above-described vehicle peripheral obstacle notification system as the sixth embodiment can display an image closely reflecting the state of the moving obstacle visibly recognizable by the user's naked eye, allowing the user easily to grasp the situation on site. As a result, the user can understand the situation quickly and ensure safety better than before.

Although the above embodiments of the present invention have been explained by use of examples in which the invention is applied to the large-sized dump truck, this is not limitative of this invention. Alternatively, the invention may also be applied to large-sized machines at construction site and to large-sized work machines operating on disaster site.

It is to be noted that the present invention is not limited to the aforementioned embodiments, but covers various modifications. While, for illustrative purposes, those embodiments have been described specifically, the present invention is not necessarily limited to the specific forms disclosed. Note also that some or all of the aforementioned components, functions, processors, and the like can be implemented by hardware such as an integrated circuit or the like. Alternatively, those components, functions, and the like can be implemented by software as well.

What is claimed is:

1. A vehicle peripheral obstacle notification system comprising:
    a surrounding image input part that includes a plurality of cameras mounted on a vehicle and configured to acquire images of the surroundings of a vehicle;
    a composite image formation part that extracts a part of each of the surrounding images outputted from the surrounding image input part as composite image formation areas and composes a composite bird's-eye image from the extracted composite image formation areas; and
    an output part that presents a user with the composite bird's-eye image that the composite image formation part outputted,
    wherein the vehicle peripheral obstacle notification system further comprises:
    an object detection part that detects whether a moving obstacle exists in the surrounding images;
    said composite image formation part calculating the coordinate information of the moving obstacle on the composite bird's-eye image based on the detection result of the object detection part;
    an area determination part that, when the object detection part detects the moving obstacle, determines whether the position at which the moving obstacle is detected, on the basis of the coordinate information of the moving obstacle, is inside the composite image formation areas or outside the composite image formation areas and inside the surrounding images; and
    an image information extraction part which, if the area determination part determines that the detected position of the moving obstacle is outside the composite image formation areas and inside the surrounding images, extracts information about the detected position of the moving obstacle and extracts an image of the detected moving obstacle,
    wherein the composite image formation part superimposes the image of the moving obstacle on the detection position of the moving obstacle to the composite bird's-eye image based on the information about the detected position of the moving obstacle and the image of the moving obstacle output from the image information extraction part, and outputs the composite bird's eye image having the image of the moving obstacle superimposed thereon to the output part.

2. The vehicle peripheral obstacle notification system according to claim 1, wherein the composite image formation part highlights the detected position of the moving obstacle and displays the image of the moving obstacle at a position different from the detected position of the moving obstacle based on the information about the detected position of the moving obstacle and the image of the moving obstacle output from the image information extraction part.

3. The vehicle peripheral obstacle notification system according to claim 1, wherein, if the area determination part determines that the detected position of the moving obstacle is inside the composite image formation areas, the image information extraction part extracts the information about the detected position of the moving obstacle and extracts the image of the detected moving obstacle for output to the composite image formation part for superimposition onto the composite bird's-eye image.

4. The vehicle peripheral obstacle notification system according to claim 1, wherein, if the area determination part determines that the detected position of the moving obstacle is outside the composite image formation areas and inside the surrounding images,
    the composite image formation part provides a translucent display of the areas other than those indicated by the composite bird's-eye image and highlights the detected position of the moving obstacle when composing the surrounding images.

5. The vehicle peripheral obstacle notification system according to claim 1,
    wherein if the area determination part determines that the detected position of the moving obstacle has changed from inside the composite image formation areas to a detected position that is outside the composite image formation areas and inside the surrounding images, the image information extraction part retains the image of the moving obstacle acquired inside the composite image formation areas, and
    wherein, while the detected position of the moving obstacle remains outside the composite image formation areas and inside the surrounding images, the image information extraction part outputs, the information about the detected position of the moving obstacle and the retained image of the moving obstacle acquired inside the composite image formation areas, to the composite image formation part for superimposition onto the composite bird's-eye image.

* * * * *